United States Patent
Dunko (10) Patent No.: US 9,473,614 B2
(45) Date of Patent: Oct. 18, 2016

(54) SYSTEMS AND METHODS FOR INCORPORATING A CONTROL CONNECTED MEDIA FRAME

(75) Inventor: Gregory A. Dunko, Cary, NC (US)

(73) Assignee: HTC CORPORATION, Taoyuan (TW)

( * ) Notice: Subject to any disclaimer, the term of this patent is extended or adjusted under 35 U.S.C. 154(b) by 428 days.

(21) Appl. No.: 13/208,609

(22) Filed: Aug. 12, 2011

(65) Prior Publication Data
US 2013/0042177 A1 Feb. 14, 2013

(51) Int. Cl.
*G06F 3/048* (2013.01)
*H04M 1/725* (2006.01)

(52) U.S. Cl.
CPC ..... *H04M 1/72522* (2013.01); *H04M 1/72544* (2013.01)

(58) Field of Classification Search
CPC ............. H04N 5/44543; H04N 21/4622; H04N 21/47; G11B 27/34; G11B 27/034; H04M 1/72544; H04M 1/72522
USPC ........................................................ 715/716
See application file for complete search history.

(56) References Cited

U.S. PATENT DOCUMENTS

| | | | |
|---|---|---|---|
| 7,937,451 B2 * | 5/2011 | Ho et al. | 709/217 |
| 8,015,159 B2 * | 9/2011 | Boicey et al. | 707/661 |
| 8,271,575 B2 * | 9/2012 | Hunter | 709/201 |
| 2005/0091596 A1 * | 4/2005 | Anthony et al. | 715/712 |
| 2005/0235338 A1 * | 10/2005 | AbiEzzi et al. | 725/142 |
| 2006/0075015 A1 * | 4/2006 | Wu et al. | 709/202 |
| 2007/0115373 A1 * | 5/2007 | Gallagher | G06F 17/30265 348/231.3 |
| 2009/0055742 A1 * | 2/2009 | Nordhagen | 715/716 |
| 2009/0119589 A1 * | 5/2009 | Rowell et al. | 715/716 |
| 2009/0228544 A1 * | 9/2009 | Demers et al. | 709/201 |
| 2009/0282336 A1 * | 11/2009 | Lindley et al. | 715/716 |
| 2010/0005067 A1 * | 1/2010 | Howard et al. | 707/3 |
| 2010/0095353 A1 * | 4/2010 | Athsani et al. | 726/4 |
| 2010/0131845 A1 * | 5/2010 | Pann | 715/716 |
| 2011/0018833 A1 * | 1/2011 | Kim et al. | 345/173 |
| 2011/0065451 A1 * | 3/2011 | Danado et al. | 455/456.1 |
| 2011/0234504 A1 * | 9/2011 | Barnett et al. | 345/173 |
| 2011/0321100 A1 * | 12/2011 | Tofighbakhsh | 725/58 |
| 2012/0151342 A1 * | 6/2012 | Trotta et al. | 715/716 |

FOREIGN PATENT DOCUMENTS

WO WO 2011056105 A1 * 5/2011

* cited by examiner

*Primary Examiner* — Jennifer To
*Assistant Examiner* — John Repsher, III
(74) *Attorney, Agent, or Firm* — McClure, Qualey & Rodack, LLP (57) ABSTRACT

Various embodiments are described for managing media content using a communications device. One embodiment is a method that comprises providing, by the communications device, a user interface for a user to access the media content. The method further comprises receiving a user input from the user via the user interface, searching a media content database for media content corresponding to the user input, and updating the user interface according to the media content corresponding to the user input and displaying in a specified order.

21 Claims, 7 Drawing Sheets

SYSTEMS AND METHODS FOR INCORPORATING A CONTROL CONNECTED MEDIA FRAME

TECHNICAL FIELD

The present disclosure generally relates to communications and more particularly, to systems and methods for incorporating a control connected media frame.

BACKGROUND

Over the years, mobile devices such as smartphones have become widespread. With the rapid development in communication technology, smartphones have become an integral part of many people's lives given the portability, the convenient access to the Internet, and the growing number of applications available on smartphones. Today, individuals can perform a wide range of functions such as shopping, social networking, etc. via smartphones.

With the widespread use of digital cameras such as those integrated into smartphones, many individuals turn to image management tools to archive and organize their digital photographs. Image management tools offer various features, including various means for organizing digital photos. However, manually identifying photos of interest and sorting through a large volume of photos for future access can be tedious and time-consuming. Furthermore, with the popularity of social networking sites, digital photos of an individual may be found not only on the individual's own personal computer but also on social networking sites and digital photo sharing websites where friends may post and tag photos of the individual. While applications exist that allow users to share and access digital photos, one challenge lies in the fact that the digital photos may be dispersed in a number of locations. Similarly, individuals may wish to access other forms of media content such as video clips that contain the individuals. A need therefore exists for an alternative means for accessing such media content.

SUMMARY

Briefly described, one embodiment, among others, is a method that comprises providing, by the communications device, a user interface for a user to access the media content. The method further comprises receiving a user input from the user, searching a media content database in at least one remote entity for media content corresponding to the user input, updating the user interface according to the media content corresponding to the user input, and displaying the media content in a specified order.

Another embodiment is a system for managing media content, where the system comprises a media content manager configured to update a media content database from at least one remote entity, a user interface generator configured to provide a user interface for a user to access the media content, and a touchscreen interface for receiving an input from the user. The media content manager is further configured to search the media content database for media content corresponding to the user input through a communication network, and the user interface generator updates the user interface according to the media content corresponding to the user input.

Another embodiment is a non-transitory computer-readable medium embodying a program executable in a computing device. The program comprises logic for updating a media content database from one or more remote entities through a communication network, logic for providing a user interface for a user to access the media content, wherein the user interface includes a slider control for navigating the media content. The non-transitory computer-readable medium further comprises a touchscreen interface for receiving an input from the user and logic for searching the media content database for media content corresponding to the user input, wherein the user input comprises a time input, a subject input, a location input, or an event input. The non-transitory computer-readable medium also comprises logic for updating the user interface according to the media content corresponding to the user input, wherein the media content corresponding to the user input is arranged in a specified order.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

With the widespread use of digital cameras, many individuals turn to image management tools to archive and organize their digital photographs. Image management tools offer various features, including various means for organizing digital photos. However, manually identifying photos and sorting through a large volume of photos for future access can be tedious and time-consuming. Furthermore, with the popularity of social networking sites, digital photos of an individual may be found not only on the individual's own personal computer but also on various social networking sites as well as digital photo sharing websites where friends may post and tag photos of the individual.

Large amounts of digital media content are typically downloaded to a computer or uploaded to an Internet-based image storing service. With wirelessly connected devices, it is possible to send this content to a storage service as soon as the image is captured. This content is then available to any Internet connected device or media server. Increasingly, image capture devices are equipped with the ability to time-tag and\or tag with a location identifier (e.g., via a geotag or other type of location tag) captured images. Thus, captured images may have associated metadata that includes such information as the time and date of image capture, the location where the image was captured, and even information about the captured content such as subject identity or event.

When uploading captured images to a web album hosted by an Internet-based image storing service, the user can edit the tags associated with the captured images in order to classify and organize the massive amount of content. Many people store their captured images on such digital content sharing websites (e.g., Google Picassa®, Flickr®) to share the captured images with families and friends. However, even with the availability of tags and other metadata associated with captured image, searches still require the user to manually select and consolidate captured images to create an album, slideshow, etc. A need therefore exists for an alternative means for accessing such media content.

Various embodiments are described for creating a digital media frame on a computing device such as, for example, a smartphone, tablet, or other computing device where the computing device is connected to one or more remote entities such as an image media server. An end user is able to interact or navigate through the digital media frame, where the content in the digital media frame is arranged according to one or more criteria specified by the user and where the content comprises digital images, audio files, video files, etc. The content may be retrieved from digital content sharing entities (e.g., a digital content sharing server(s)) hosting digital content sharing websites, social networking entities (e.g., a social networking server(s)) hosting social networking websites, and/or other computing devices. For example, the user may specify that the content is to be arranged according to time stamps associated with the content where a timeline is presented to the user with the content chronologically arranged for viewing purposes. The timeline may start from the date of the oldest stored image content and continue up until the present, where the timeline is constantly updated as new photos become available for viewing.

Figure 1:
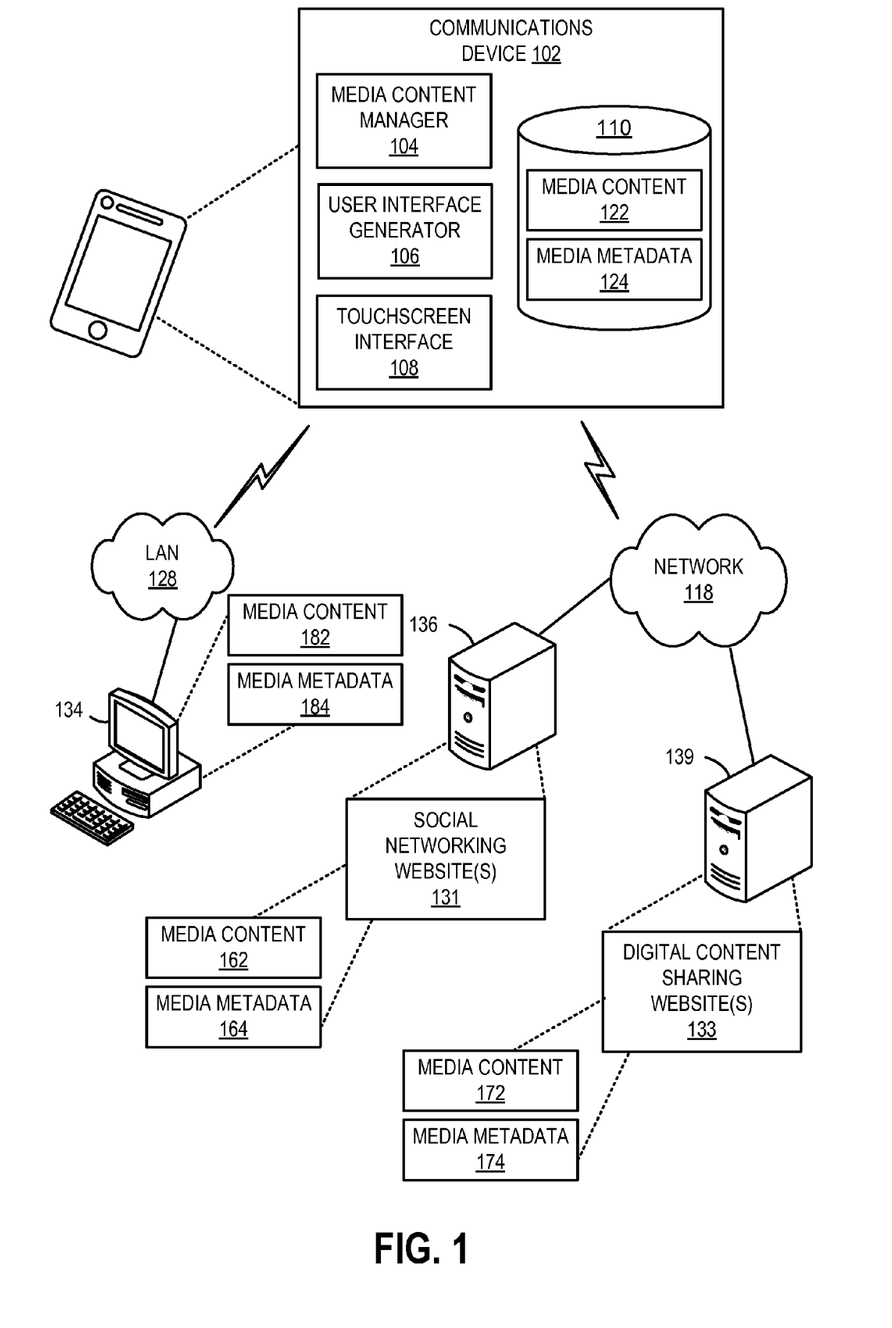
FIG. 1 is a block diagram of a communications device configured to provide a media frame user interface for a user to navigate through content arranged according to one or more criteria.

A description of a system for providing a control connected media frame in a networked environment is now described followed by a discussion of the operation of the components within the system. FIG. 1 is a block diagram of a communications device 102 configured to provide a media frame in the form of a user interface for a user to navigate through content arranged according to one or more criteria. The communications device 102 may be embodied as a computing device, such as by of example and without limitation, a smartphone, tablet, or other similar device. The communications device 102 comprises a media content manager 104, a user interface generator 106, and a touchscreen interface 108. The communications device 102 also includes a media content database 110 or other data store structure for storing downloaded media content 122 and metadata 124 associated with the media content 122.

For various embodiments, the media content manager 104 is configured to update the media content database 110 and search the media content database 110 for media content 122 corresponding to user input. The user interface generator 106 is configured to provide a user interface for a user to access the media content 122. The user interface generator 106 also updates the user interface according to the media content 122 corresponding to the user input. The touchscreen interface 108 is configured to receive input from the user via a touchscreen display on the communications device 102.

As shown in FIG. 1, the communications device 102 may be coupled to a network 118 such as the Internet and communicates with various remote entities comprising, for example, social networking server(s) 136 hosting social networking website(s) 131 and digital content sharing server(s) 139 hosting digital content sharing website(s) 133, where the servers 136, 139 store digital media content 162, 172 and corresponding metadata 164, 174. The communications device 102 may also be coupled to a local area network (LAN) 128 to one or more computing devices 134 storing media content 182 and corresponding metadata 184. The local computing device 134 may also be connected to the network 118. The communications device 102 may be communicatively coupled to the various remote entities via a wireless connection such as, for example, a Bluetooth connection, an infrared connection, and wireless local area network (WLAN) or other wireless connection. In other implementations, the communications device 102 may be coupled by a wired connection such as, for example, an Ethernet cable.

Figure 2:
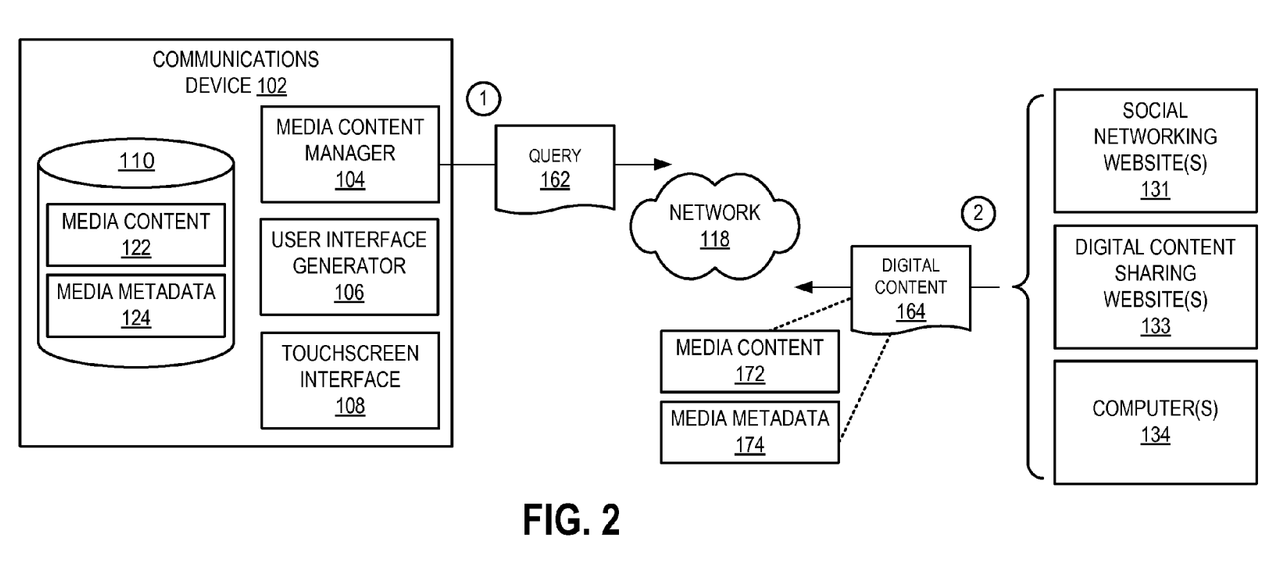
FIG. 2 illustrates the communications device of FIG. 1 querying one or more remote entities to retrieve media content.

FIG. 2 illustrates the communications device 102 of FIG. 1 communicating with one or more remote entities to retrieve media content 122. In accordance with some embodiments, the communications device 102 may be configured to query the one or more remote entities shown in FIG. 1. A user of the communications device 102 may specify one or more social networking servers 136, digital content sharing servers 139, and/or computing devices 134 from which to retrieve media content. Based on the predetermined list of target entities, the media content manager 104 in the communications device 102 may be configured to periodically poll the target remote entities. As shown, the media content manager 104 generates a query 162 that is sent to the one or more remote entities.

The query 162 may include, for example, search criteria relating to media content. For example, the query 162 may include a tag (e.g., a name, string identifier, geotag), a time stamp, an event stamp, and/or other attributes associated with media content. The query 162 may comprise one or a combination of such attributes. For example, in one scenario, the media content manager 104 may query all the remote entities for digital photos of "Benjamin Moy" taken in the year 2011. As further illustrated in FIG. 2, the one or more remote entities respond to the query 162 with digital content 164 matching the specified criteria, where the digital content 164 comprises media content 172 and corresponding media metadata 174, both of which are stored by the media content manager 104 in the media content database 110.

Figure 3:
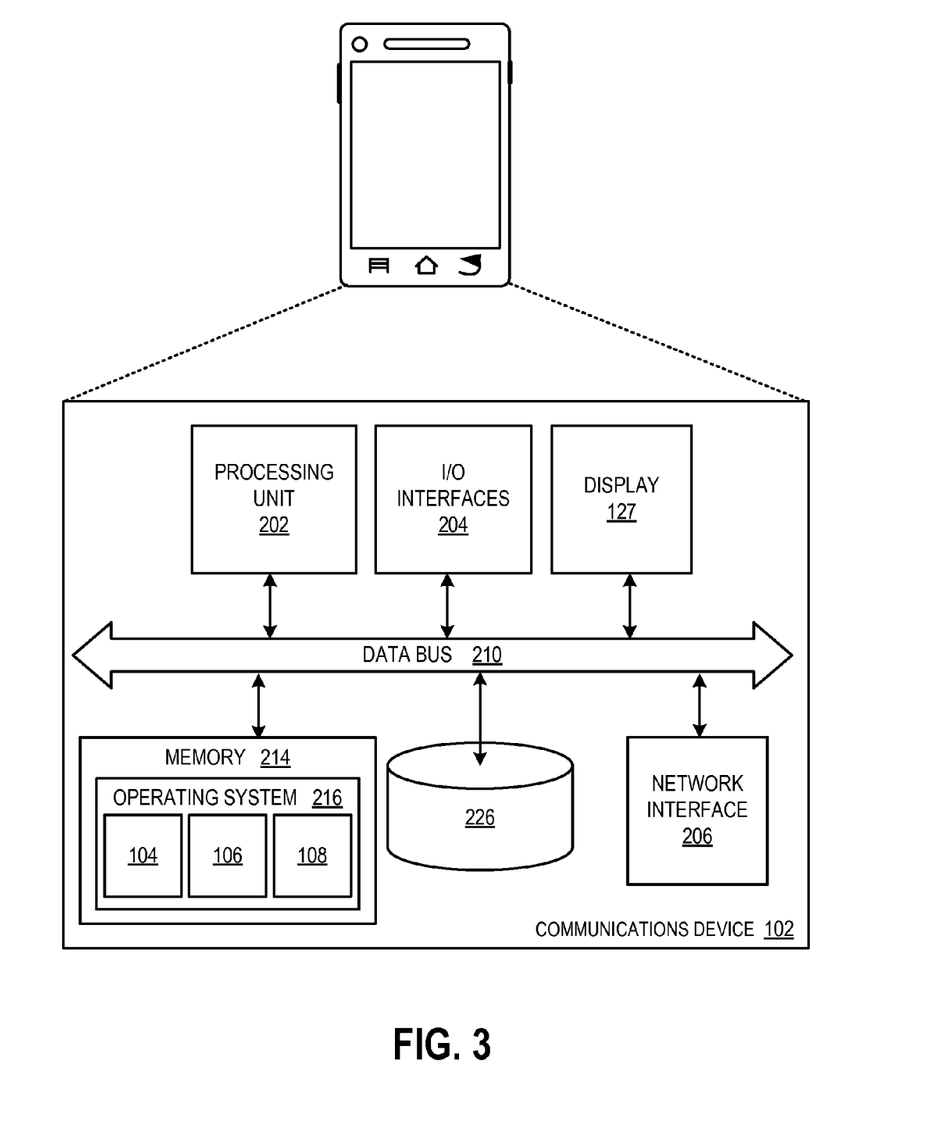
FIG. 3 illustrates an embodiment of the communications device shown in FIG. 1.

FIG. 3 illustrates an embodiment of the communications device 102 shown in FIG. 1. As described earlier, the communications device 102 may be embodied as a smartphone, tablet, or other computing device, which may be embodied in any one of a wide variety of wired and/or wireless computing devices. As shown in FIG. 3, the communications device 102 comprises memory 214, a processing unit 202, a number of input/output interfaces 204, and a network interface 206, where the communications device 102 is configured to communicate with remote entities such as the entities 136, 139, 134 depicted in FIG. 1 via the network interface 206. The communications device 102 further comprises a display area 127 and mass storage 226, wherein each of these devices are connected across a local data bus 210.

The processing unit 202 may include any custom made or commercially available processor, a central processing unit (CPU) or an auxiliary processor among several processors associated with the communications device 102, a semiconductor based microprocessor (in the form of a microchip), a macroprocessor, one or more application specific integrated circuits (ASICs), a plurality of suitably configured digital logic gates, and other well-known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements. The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components 104, 106, 108 of the communications device 102 depicted in FIG. 1.

In accordance with such embodiments, the components 104, 106, 108 are stored in memory 214 and executed by the processing unit 202. The media content database 110 shown in FIG. 1 may be implemented in mass storage 226. The touchscreen interface 108 is configured to detect contact within the display area 127 of the communications device 102 and provides such functionality as on-screen buttons, menus, keyboards, etc. that allows users to navigate user interfaces by touch. One of ordinary skill in the art will appreciate that the memory 214 can, and typically will, comprise other components which have been omitted for purposes of brevity. Note that in the context of this disclosure, a non-transitory computer-readable medium stores programs for use by or in connection with an instruction execution system, apparatus, or device.

In this regard, one embodiment, among others, is a non-transitory computer-readable medium embodying a program executable in a computing device. For such embodiments, the program comprises logic for providing a user interface for a user to access the media content, wherein the user interface includes a slider control for navigating the media content. The non-transitory computer-readable medium further comprises a touchscreen interface for receiving an input from the user and logic for searching a media content database for media content corresponding to the user input, wherein the user input comprises a time input or an event input. The non-transitory computer-readable medium also includes logic for updating the user interface according to the media content corresponding to the user input, wherein the media content corresponding to the user input is arranged according to the time input or to the event input.

Figure 4A:
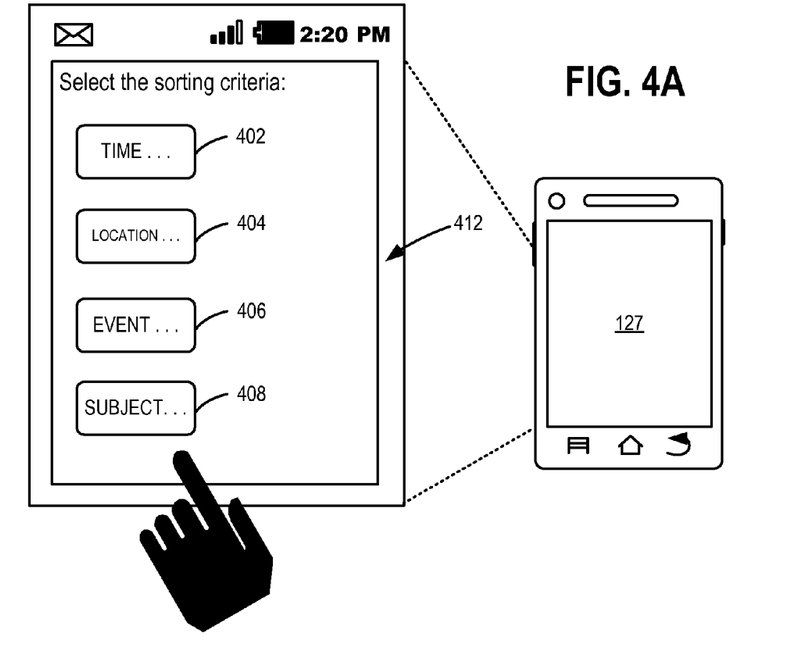
FIGS. 4A, B illustrate the process of generating a user interface based on user input.
Figure 4B:
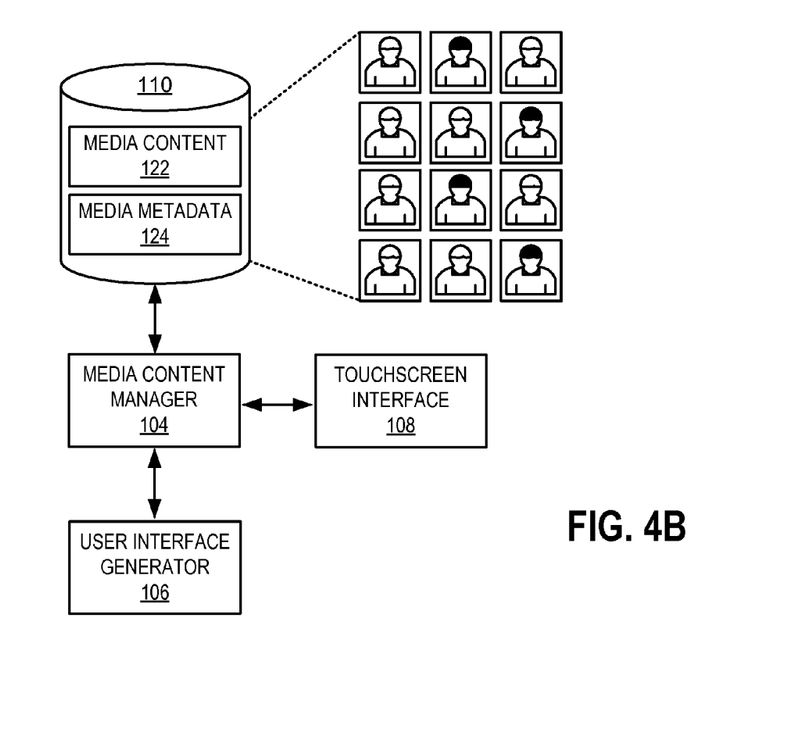

FIGS. 4A, B illustrate the process of generating a user interface based on user input. Shown in FIG. 4A is an example user interface 412 on the display area 127 of the communications device 102 for receiving user input for retrieving and arranging media content 122. The example user interface 412 shows various ways in which the media content 122 may be arranged for viewing purposes. As illustrated, the user may wish to organize the media content according to time 402, according to a geographical location 404, according to a specific event 406, and/or according to a subject identity 408. While buttons are shown in the user interface 412, other means for receiving user input may be implemented as well. Furthermore, the example shown in FIG. 4A is not meant to limit the scope of the disclosure as other criteria for arranging the media content may be utilized as well.

For each of the selections 402, 404, 406, and 408, the user may be further prompted to provide additional information. For example, upon selection of the time selection box 402, the user may be prompted to enter a specific date or date range. For the location selection box 404, the user may be further prompted to specify a location, for example, in the form of global positioning system (GPS) coordinates or a physical address. Note that the location may also comprise a simple location identifier (e.g., "Zion National Park" or "North Carolina"). For the event selection box 406, the user may be prompted to further specify an event (e.g., a birthday party celebration, a vacation). For the subject identity selection box 408, the user may be prompted to further specify a person (e.g., Benjamin Moy). In this regard, the selection by the user determines what media content 122 is shown and how the media content 122 is arranged.

With reference to FIG. 4B, the touchscreen interface 108 processes the user's selection and communicates this to the media content manager 104. The media content manager accesses the media content database 110 and retrieves media content 122 based on the user's input. Note that the media content database 110 may contain a large amount of previously downloaded media content 122 comprising, for example, digital images, audio files, and video files. In accordance with another embodiment, the media content database 110 may be updated via the digital content sharing websites, social networking websites, and local computing devices according to a query relating to a specific tag for the latest media contents 122 and metadata 124. As shown, the media content database 110 further stores metadata 124 associated with the media content 122. The metadata 124 contains information relating to attributes or characteristics of the associated media content 122. Such information may comprise, for example, location tags (such as, but not limited to, geotags), string identifiers, tags comprising one or more keywords, classifiers, time/data stamps, and other forms of information relating to the media content 122.

Based on the information received from the touchscreen interface 108, the media content manager 104 retrieves media content 122 from the media content database 110 according to the criteria specified by the user. Based on the retrieved media content 122, the user interface generator 106 generates an interactive media frame in the form of a user interface that the user can navigate to view media content 122.

Figure 5:
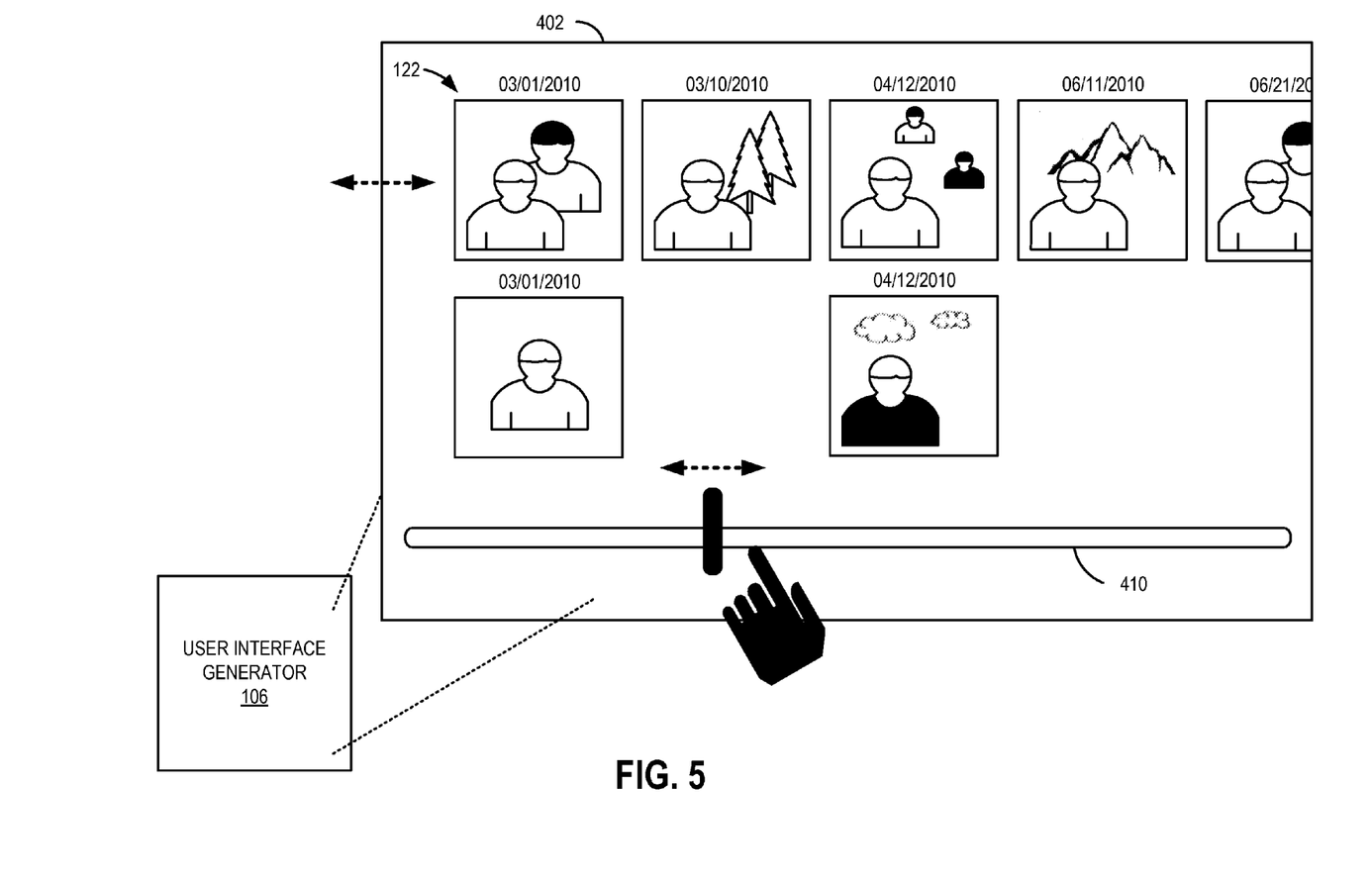
FIG. 5 is just one example of a user interface generated by the communications device that the user can navigate.

FIG. 5 is just one example of a user interface 402 generated by the communications device 102 that the user can navigate. In this illustration, the media content 122 comprises digital images and the user interface 402 essentially represents an interactive picture frame that renders the images according to a specified criteria. Note, however, that the media content 122 may also comprise other forms of media such as video clips, audio clips, and so on. In the example shown in FIG. 4, the media content 122 is arranged according to time. Specifically, the media content 122 is arranged so that images with the same date stamp are grouped together, where older images are shown to the left. Using the display area 127 on the communications device 102, the user selects a time for displaying images with the selected date stamp. For some embodiments, the user can scroll from one date to another on the timeline 410.

To select a time, the user may, for example, perform a dragging motion using the slider control shown on the slider control 410, which may represent, for example, a timeline. By simply dragging the slider control, the clusters of images move accordingly. For some embodiments, the media content manager 104 may continue running in the background and interfacing with the remote entities shown in FIG. 1 to constantly archive new images in the media content database 110. This allows the user interface 402 to stay up-to-date as new photos become available on the remote entities. For example, if a friend of the user posts a photo of the user on a social networking website, the media content manager 104 downloads a copy of the photo and stores it into the media content database 110.

The photo is also forwarded to the user interface generator 106 to be included in the user interface 402. In this regard, the user interface 402 is constantly updated. For some embodiments, the user can specify which remote entities (e.g., social networking entity and/or digital content sharing entity) to access so that the media content manager 104 only interfaces with those websites. The user interface easily allows a user to select a desired timeframe to collect images to view. If the user wishes to see an image or images from a different time, then the user simply touches the screen to select a new time. In the example shown in FIG. 5, the slider control 410 may disappear after a predetermined amount of time and reappear when the user touches the screen.

Figure 6:
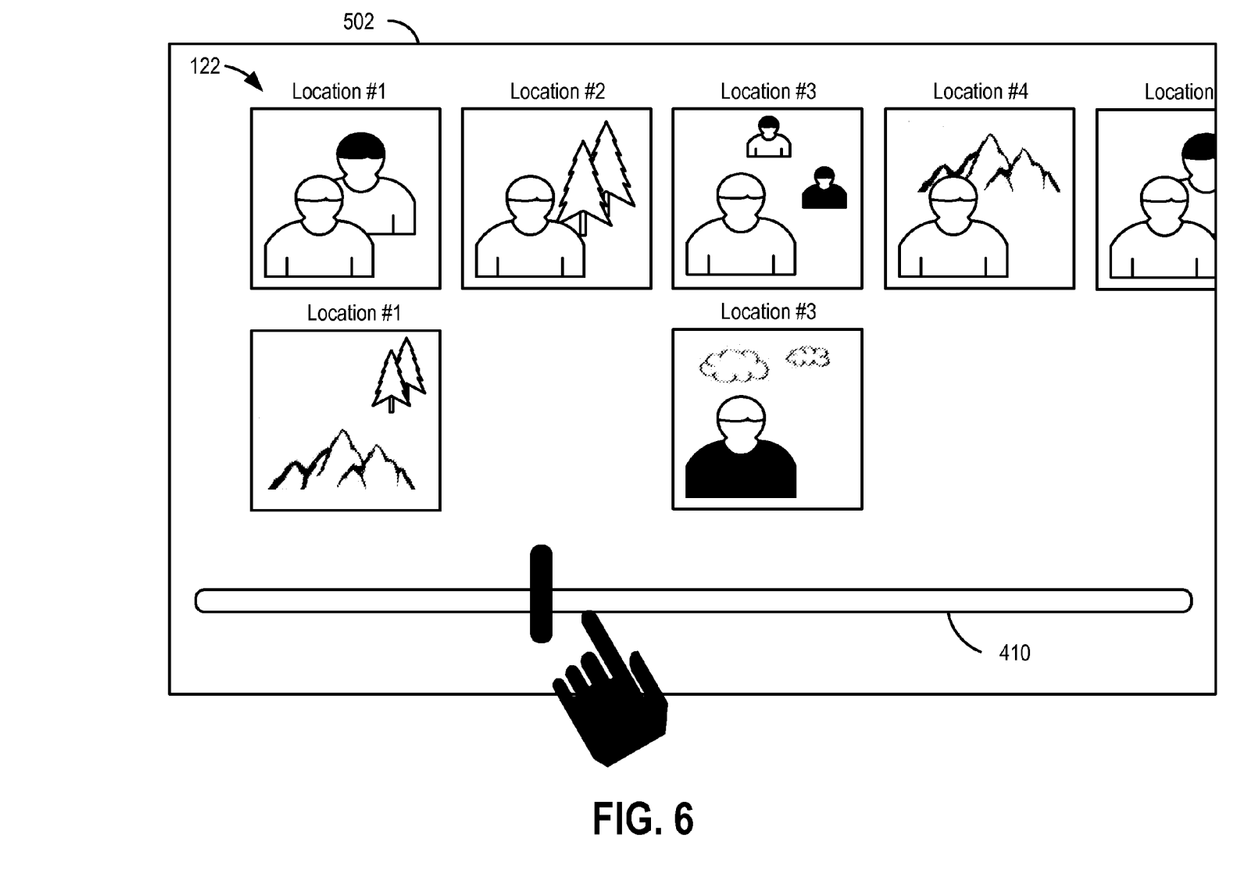
FIG. 6 is another example of a user interface generated by the communications device that the user can navigate.

FIG. 6 is another example of a user interface 502 generated by the communications device 102 that the user can navigate. In this illustration, the media content 122 is arranged according to a geographical-based criteria. Such criteria may comprise GPS coordinates, a physical address, and/or a geographical based tag (for example, "Matthew's home" or "the office"). Again, using the slider control in the control bar 410, the user can navigate through the media content 122 by simply dragging the slider control left to right, or vice versa. With the example user interface described earlier in connection with FIG. 5, the media content 122 is arranged so that images with the same date stamp are grouped together, where older images are shown to the left. In the example user interface shown in FIG. 6, the clusters of media content 122 may be sorted according to various criteria. For example, the location-based clusters shown in FIG. 6 may be sorted according to location, where the location associated with the media content 122 closest to home (or some other specified reference location) are shown all the way to the left. The arrangement spans to the right, where the location associated with the media content 122 is farthest away from home (or the designated reference location). In accordance with other implementations, the location-based clusters may be arranged such that those clusters on the far left represent locations farthest to the West while clusters to the far right represent locations farthest to the East with respect to a specified reference point. Note that the examples above are for illustration purposes only and other sorting criteria may be implemented as well. As with the example in FIG. 4, the user interface 502 may be constantly updated based on media content retrieved by the media content manager 104, where the media content manager 104 may be configured to run in the background and interface with remote entities specified by the user. Through the various embodiments described, the user can interactively filter media content to be presented.

Figure 7:
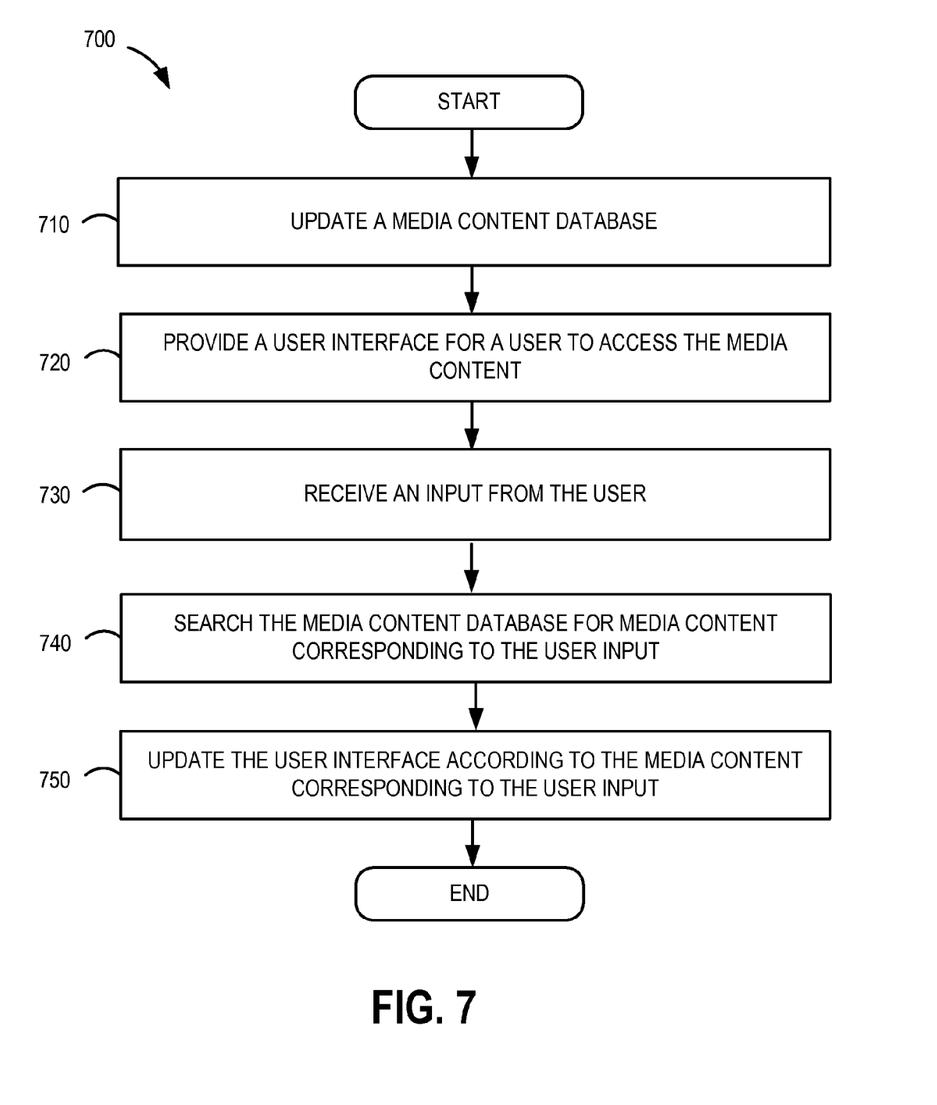
FIG. 7 is a flowchart in accordance with an embodiment for providing a control connected media frame implemented in the communications device 102 shown in FIG. 1.

FIG. 7 is a flowchart in accordance with an embodiment for providing a control connected media frame implemented in the communications device 102 shown in FIG. 1. If embodied in software, various blocks depicted in FIG. 7 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart 700 in FIG. 7 shows a specific order of execution, it is understood that the order of execution may differ from that which is depicted. In accordance with some embodiments, a method is implemented in the communications device 102 (FIG. 1) for managing media content 122. In block 710, the communications device 102 updates the media content database 110 (FIG. 1). The media content database 110 may be updated on a regular basis, in a manual fashion or upon a query being made. In block 720, a user interface is provided for a user to access the media content 122. In block 730, an input is received from the user. As described above, the input may be received via the display area 127 shown earlier in FIG. 4A. In block 740, the media content database 110 in FIG. 1 is searched for media content 122 corresponding to the user input. In block 750, the user interface is updated according to the media content 122 corresponding to the user input. For example, the user may specify that only media content 122 relating to a specific date, location, event, and/or subject identity being presented in the user interface.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method implemented in a communications device for managing media content, comprising:
   providing, by the communications device, a user interface for a user to access media content;
   receiving a user input from the user via the user interface, the user input specifying media content to be searched, a location characteristic of the media content, and a reference location;
   searching a media content database in at least one remote entity for media content corresponding to the user input; and
   updating the user interface to include the media content corresponding to the user input and displaying the media content corresponding to the user input in a specified order, wherein updating the user interface to include the media content corresponding to the user input comprises:

forming clusters of the media content corresponding to the user input based on the location characteristic specified in the user input; and sorting the clusters of the media content corresponding to the user input according to the specified order relative to the specified reference location, wherein the clusters are arranged according to distance from the specified reference location with respect to one of: east-west directions and north-south directions.

2. The method of claim 1, wherein receiving the input from the user is performed by a touch screen on the communications device, and wherein the input comprises one of: a dragging motion by the user relating to direction; and a selection by the user.

3. The method of claim 2, wherein the direction of the dragging motion by the user corresponds to the specified order of the media content displayed on the user interface.

4. The method of claim 1, further comprising updating, by the communications device, the media content database.

5. The method of claim 4, wherein updating the media content database comprises:
  accessing the at least one remote entity via a wireless communication network;
  searching the at least one remote entity for media content according to the location characteristic of the media content; and
  retrieving media content matching one or more target characteristics and storing the retrieved media content in the media content database.

6. The method of claim 5, wherein the one or more target characteristics are determined based on metadata associated with the media content, wherein the metadata comprises one or more of: location information, tag, time stamp, subject identity, and string identifier.

7. The method of claim 5, wherein the at least one remote entity comprises one or more of:
  a social networking entity;
  a digital content sharing entity; and
  a computing device.

8. The method of claim 4, wherein updating the media content database is performed upon receiving of the user input.

9. The method of claim 1, wherein the communications device is one of: a smartphone, a tablet, and a computing device.

10. The method of claim 1, wherein the at least one remote entity is specified by the user via the user interface.

11. The method of claim 1, wherein the user interface comprises a slider control for navigating through the media content corresponding to the user input in the specified order.

12. A system for managing media content, comprising:
  a processor;
  an application executable in the processor, the application comprising:
  a media content manager configured to update a media content database in at least one remote entity;
  a user interface generator configured to provide a user interface for a user to access media content stored in the media content database; and
  a touchscreen interface for receiving a user input from the user, the user input specifying media content to be searched, a location characteristic of the media content to be searched, and a reference location;

wherein the media content manager is further configured to search the media content database for media content corresponding to the user input through a communication network;

wherein the user interface generator updates the user interface to include the media content corresponding to the user input; and wherein the user interface generator updates the user interface by forming clusters of the media content corresponding to the user input based on the location characteristic specified in the user input and sorting the clusters of the media content corresponding to the user input according to a specified order relative to the specified reference location, wherein the clusters are arranged according to distance from the specified reference location with respect to one of: east-west directions and north-south directions.

13. The system of claim 12, wherein the media content manager searches the media content database according to one or more characteristics comprising: time, subject identity, and event.

14. The system of claim 12, wherein the media content manager updates the media content database by searching the at least one remote entity for media content, retrieves media content matching one or more target characteristics, and stores the retrieved media content in the media content database.

15. The system of claim 14, wherein the at least one remote entity comprises one or more of:
  a social networking entity,
  a digital content sharing entity, and
  a computing device;
  where the at least one remote entity is specified by a user of the system.

16. A non-transitory computer-readable medium embodying a program executable in a computing device, the program comprising:
  logic for updating a media content database from one or more remote entities through a communication network;
  logic for providing a user interface for a user to access media content stored in the media content database, wherein the user interface includes a slider control for navigating the media content;
  logic for receiving a user input from the user via the user interface, the user input specifying media content to be searched, a location characteristic of the media content, and a reference location;
  logic for searching the media content database for media content corresponding to the user input; and
  logic for updating the user interface to include the media content corresponding to the user input by forming clusters of the media content corresponding to the user input based on the location characteristic, and sorting the clusters according to a specified order relative to the specified reference location, wherein the clusters are arranged according to distance from the specified reference location with respect to one of: east-west directions and north-south directions.

17. The non-transitory computer-readable medium of claim 16, wherein the logic for updating the media content database is configured to update the media content database by retrieving media content from the one or more remote entities according to metadata.

18. The non-transitory computer-readable medium of claim 17, wherein the one or more remote entities comprise one or more of:

a social networking entity,
a digital content sharing entity, and
a computing device;
wherein the one or more remote entities are specified by the user.

19. The non-transitory computer-readable medium of claim 17, wherein the metadata comprises one or more of: location information, a string identifier, a subject identity, and a time stamp.

20. The non-transitory computer-readable medium of claim 16, wherein the computing device comprises one of: a smartphone, a tablet, and a computing device.

21. The method of claim 1, wherein the location characteristic comprises one of: current location of the communication device; and a location specified by the user.

* * * * *